O. H. BRITTAIN.
AUTOMOBILE ATTACHMENT.
APPLICATION FILED NOV. 20, 1919.
1,369,879.
Patented Mar. 1, 1921.
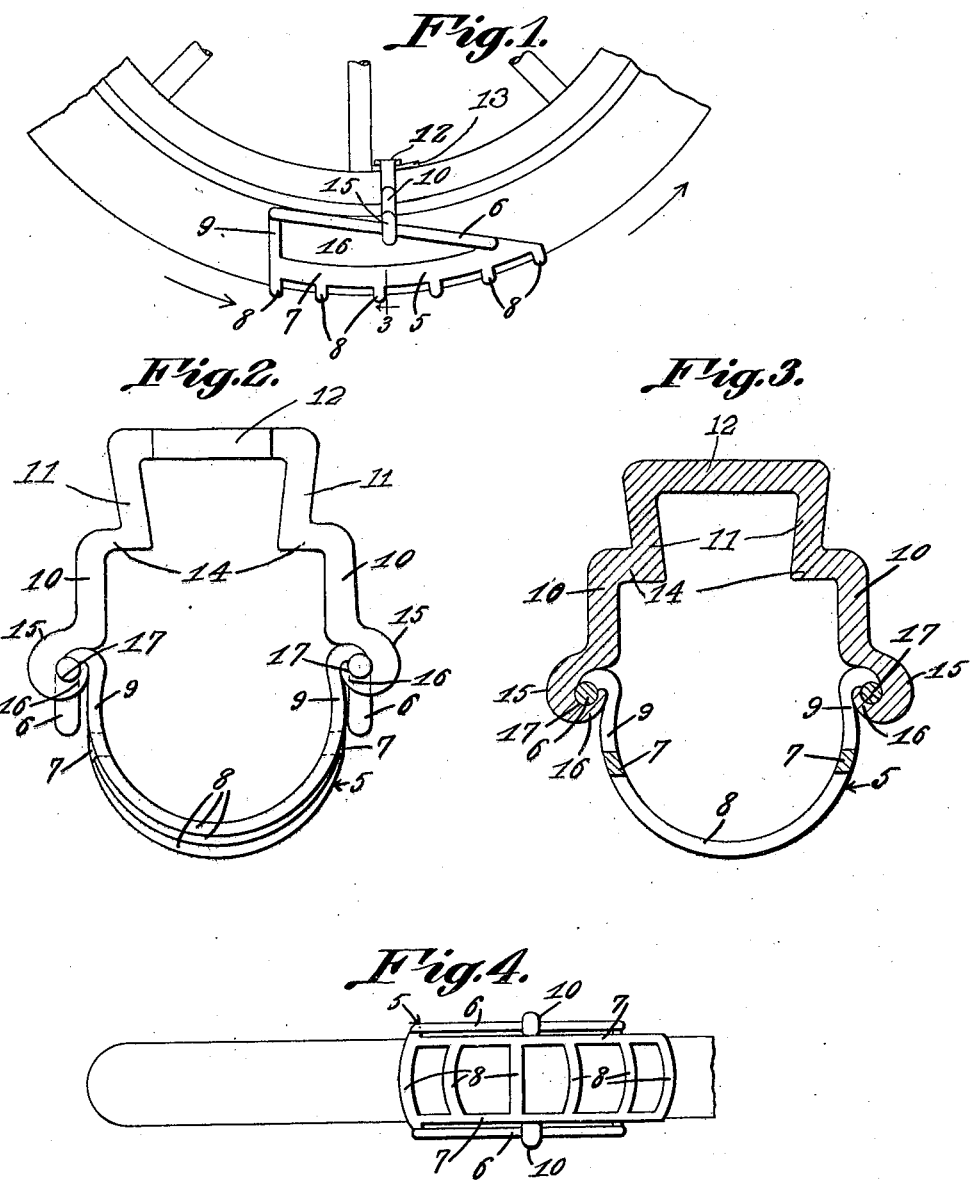

UNITED STATES PATENT OFFICE.

OTIS H. BRITTAIN, OF PELL CITY, ALABAMA.

AUTOMOBILE ATTACHMENT.

1,369,879. Specification of Letters Patent. Patented Mar. 1, 1921.

Application filed November 20, 1919. Serial No. 339,501.

*To all whom it may concern:*

Be it known that I, OTIS H. BRITTAIN, a citizen of the United States, residing at Pell City, in the county of St. Clair and State of Alabama, have invented a new and useful Automobile Attachment, of which the following is a specification.

This invention relates to new and useful improvements in anti-skid devices for automobile wheels, and more particularly to devices of this character adapted to be applied to automobile tires, when the same are operating on muddy road surfaces.

The primary object of the invention is to provide an anti-skid device having means for causing the same to be securely gripped by the securing means, during the rotation in one direction, of the wheel to which the same is applied.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a fragmental elevational view of a wheel having a device constructed in accordance with the present invention, applied thereto;

Fig. 2 illustrates an end elevational view of the anti-skid device;

Fig. 3 illustrates a transverse sectional view taken on line 3—3 of Fig. 1; and

Fig. 4 illustrates a plan view of a tire showing the relation of the device when secured thereto.

Referring to the drawing in detail, the device forming the subject matter of the present invention, is provided for substituting metallic sections, disposed in spaced relation around the periphery of an automobile tire, for the usual and well known anti-skid or mud chains, in common use.

The reference character 5 designates the body of one of the anti-skid devices, which as shown, includes the inclined, outwardly extending flanges 6 disposed on opposite sides of the body, and having connection at their ends with the curved side members 7 of the body, the side members 7, being curved in order that they will conform to the contour of an automobile tire, in such a way that movement between the anti-skid device and the tire supporting the same, is absolutely prevented, thus eliminating wear at the point of contact between the tire and anti-skid device.

Transversely extending ribs 8, connect the side members 7 of the body, and are disposed in spaced relation throughout the lengths of the side members, and are curved so that the same will closely engage the tread of the tire, to provide enlargements for gripping the ground surface over which the wheel is operating, the end rib 8, is shown as extending to a point adjacent the rim of the wheel, as at 9, thus providing for the angular relation between the members 6 and the body 5, for purposes to be hereinafter more fully described.

The securing device includes the spaced arms 10, which arms continue upwardly and outwardly as at 11, the upper ends thereof being connected by the relatively wide connecting plate 12 which construction conforms to the contour of the curvature of the inner surface of the usual felly, and may, if the device is applied to a smaller wheel than that which the same is designed for, receive a wedging block 13, to provide a rigid but removable connection between the securing device and the felly.

As shown the arms 10 extend inwardly and provide shoulders 14 which shoulders in use, contact with suitable shoulders formed on the felly of the wheel, and coöperate therewith in securing the anti-skid device to the wheel. The lower extremities of the arms 10, are curved outwardly as at 15, and upwardly as at 16, and thus providing hook portions, curved as at 17 to grasp the members 6.

In the operation of the device, the body 5 thereof is positioned over the automobile tire, and the spaced arms positioned to embrace the felly of the wheel, a wedge block 13 being positioned under the plate 12, to properly support the same, the hook portions 17 of the arms being now disposed over the forward portion of the anti-skid device, the rear portion being indicated at 18, the wheel operating in the direction as indicated by the arrows, in Fig. 1 of the drawing.

It will thus be seen that upon rotation of the wheel in a direction as indicated by the arrows, the securing device, which includes the arms 10, will move toward the end 18, of the anti-skid device, thereby setting up a binding action between the inclined member 6, and the securing arms 10.

While I have shown one of these anti-skid devices, it is to be understood that in the operation of the same, such devices are to be disposed in spaced relation throughout the periphery of the tire, the number of anti-skid devices being determined by the operator, the condition of the road over which the device is operating, being considered.

Having thus described the invention, what I claim is:—

1. In an anti-skid device, a body portion including angularly disposed side members, transversely extending ribs disposed in spaced relation on the body portion, a securing device including parallel arms, said arms having hook members coöperating with the angularly disposed side members, and means for securing the securing means to a wheel.

2. In an anti-skid device for wheels, a body portion including angularly disposed side members, transversely extending ribs forming a part of the body portion, means coöperating with the angularly disposed side members for securing the anti-skid device to a wheel, said means adapted to set up a binding action between the angularly disposed side members and the wheel to which the same is applied.

3. In an anti-skid device for wheels, a body portion including side members, and ribs formed on the body, securing means including spaced parallel arms, means for supporting the parallel arms in spaced relation with each other, said securing means coöperating with the side members of the body, and adapted to set up a wedging action between the securing device and side members for securing the device to a wheel.

4. In combination with a wheel felly and a tire supported thereon, an anti-skid device including a curved body adapted to conform to the contour of the tire, said curved body including ribs, angularly disposed side members forming a part of the body, and means coöperating with the angularly disposed side members for securing the body to the tire, said means embracing the felly of the wheel.

5. In combination with a wheel felly and tire supported thereon, an anti-skid device including a transversely curved body portion adapted to be positioned over the tire, securing means embracing the felly, means for securing the securing means to the felly, and means for connecting the securing means to the body, whereby movement of one member in one direction, sets up a binding action between the tire and the body.

In testimony that I claim the foregoing as my own I have hereto affiffled my signature in the presence of two witnesses.

OTIS H. BRITTAIN.

Witnesses:
FRANK G. EMBRY,
ED. R. COLLINS.